United States Patent
Barshteyn et al.

(10) Patent No.: US 9,639,389 B1
(45) Date of Patent: May 2, 2017

(54) TECHNOLOGY FOR DYNAMIC RESOURCE POOL MASTER

(71) Applicant: International Business Machines Corporation, Armonk, NY (US)

(72) Inventors: Ilya Barshteyn, Chestnut Hill, MA (US); Cameron J. Bosnic, Jr., Dracut, MA (US); Vijay Francis, Nashua, NH (US); Yu Guo, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/951,340

(22) Filed: Nov. 24, 2015

(51) Int. Cl.
*G06F 9/455* (2006.01)

(52) U.S. Cl.
CPC .. *G06F 9/45558* (2013.01); *G06F 2009/4557* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 5,093,912 A | 3/1992 | Dong | |
| 6,889,338 B2 | 5/2005 | Srinivasan | |
| 8,108,523 B2 | 1/2012 | Kinder | |
| 8,874,960 B1 | 10/2014 | Khan | |
| 2008/0244028 A1* | 10/2008 | Le | G06F 3/0607 709/208 |
| 2015/0046925 A1* | 2/2015 | Costea | G06F 9/45558 718/1 |
| 2015/0277952 A1* | 10/2015 | Lin | G06F 9/45558 711/114 |

FOREIGN PATENT DOCUMENTS

| | | |
|---|---|---|
| CN | 103457775 A | 12/2013 |
| CN | 103929333 A | 7/2014 |

OTHER PUBLICATIONS

Krutov et al. "Implementing VMware Horizon View on IBM Flex System," Apr. 2014.*

* cited by examiner

*Primary Examiner* — Sisley Kim
(74) *Attorney, Agent, or Firm* — Anthony V. S. England; Steve Kurlowecz; Robert C. Bunker (57) ABSTRACT

For managing a pool of virtual computer systems, master status and a rebasing task are assigned to at least one virtual computer system of the pool. A non-reserved status is assigned to virtual computer systems of the pool that are not assigned tasks. A virtual computer system of the pool is selected to respond to a rebasing request. The selecting includes selecting one of the at least one virtual computer system that currently has a master status and that currently has a processing load less than a predetermined threshold and, when no virtual computer system of the pool currently has a master status and a processing load less than the predetermined threshold, selecting a non-reserved one of the virtual computer systems to perform rebasing for the request and changing the non-reserved status of the selected, non-reserved one of the virtual computer systems to master status.

20 Claims, 5 Drawing Sheets

TECHNOLOGY FOR DYNAMIC RESOURCE POOL MASTER

FIELD OF THE INVENTION

The field of the present invention concerns managing a pool of virtual computer systems.

BACKGROUND

In cloud computing, resources may be allocated automatically, such as in response to some measure of demand, or may be provisioned by users. This may be at least partly enabled by virtualization, wherein a physical computer system is logically partitioned into one or more virtual computer systems, also referred to as "virtual computer systems."

SUMMARY

A method is provided for managing a pool of virtual computer systems, according to embodiments of the present invention. The method includes assigning a master status and a rebasing task to at least one virtual computer system of the pool. Virtual computer systems in the pool are cloned from one or more parent virtual computer systems having a predetermined configuration and the at least one virtual computer system assigned master status has the predetermined configuration. A non-reserved status is assigned to virtual computer systems of the pool that are not assigned tasks. A virtual computer system of the pool is selected to respond to a rebasing request. The selecting includes selecting one of the at least one virtual computer system that currently has a master status and that currently has a processing load less than a predetermined threshold and, when no virtual computer system of the pool currently has a master status and a processing load less than the predetermined threshold, selecting a non-reserved one of the virtual computer systems to perform rebasing for the request and changing the non-reserved status of the selected, non-reserved one of the virtual computer systems to master status.

Other embodiments of the invention are disclosed and claimed, including a computer system implementation and a computer program product.

BRIEF DESCRIPTION OF THE DRAWINGS

Novel features believed characteristic of the invention are set forth in the appended claims. The invention itself, however, as well as a preferred mode of use, objectives and advantages thereof, will best be understood by reference to the following detailed description of an illustrative embodiment when read in conjunction with the accompanying drawings, wherein:

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual computer systems, and services) that can be rapidly provisioned and released with minimal management effort or interaction with a provider of the service. This cloud model may include at least five characteristics, at least three service models, and at least four deployment models.

Characteristics include the following:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models include the following:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models include the following:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
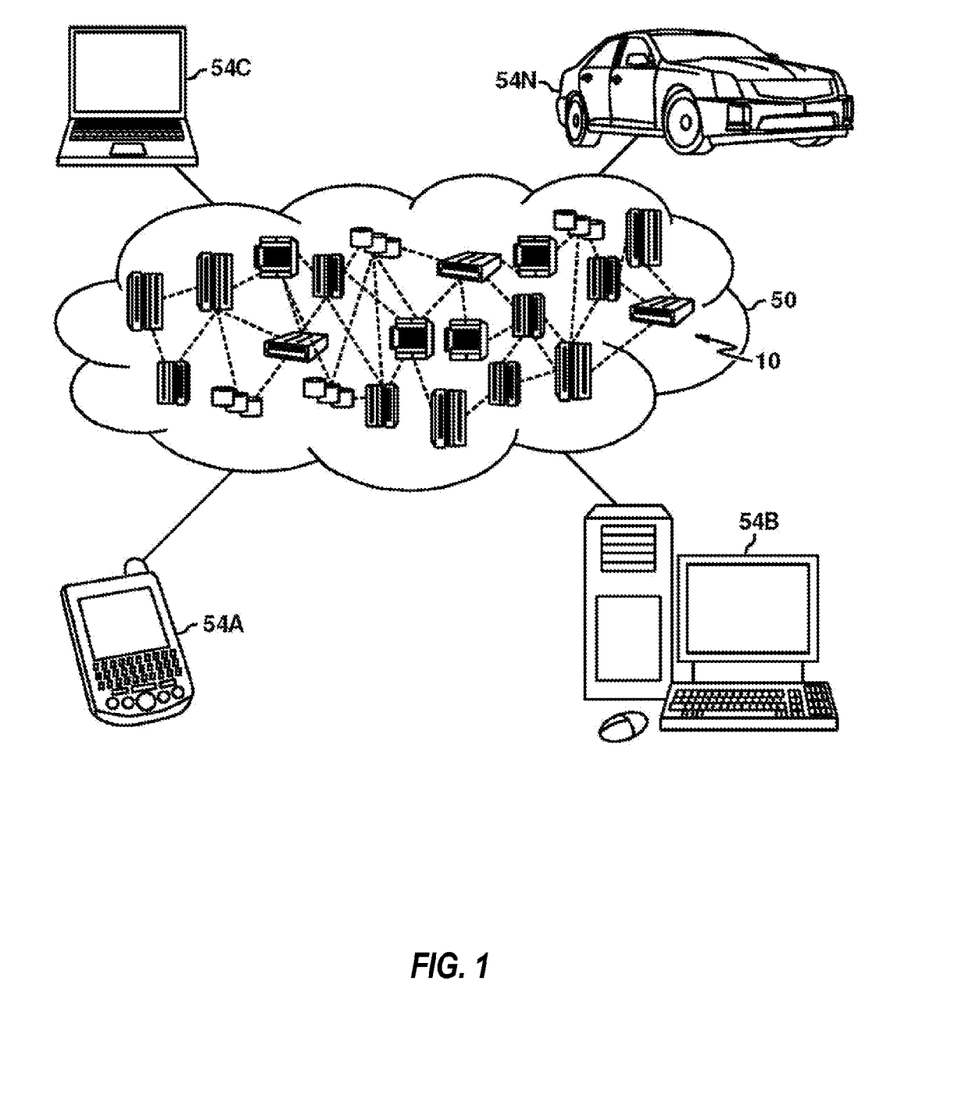
FIG. 1 depicts a cloud computing environment according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
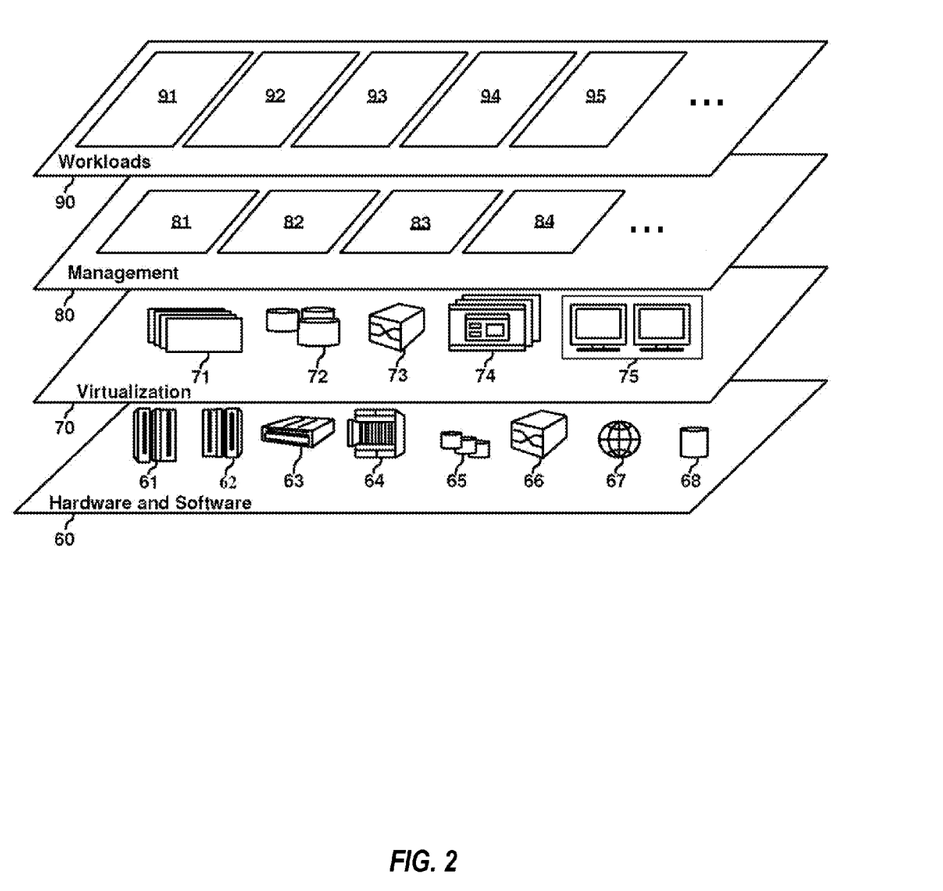
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94 and transaction processing 95.

As previously mentioned, it is known to logically partition a physical computer system into one or more virtual computer systems, and that this may be done in cloud computing. See, for example, FIG. 2 (physical servers 63 and 64 and virtual servers 71). Copies of virtual computer systems (also referred to as "virtual machines," at least some of which may be "virtual servers") may also be generated, which is commonly referred to as "cloning." A virtual computer system that is generated as a substantially identical copy of an existing virtual computer system may be referred to as a clone. The virtual computer system from which the clone was copied may be referred to as the "parent" of the clone. Embodiments of the present invention are herein disclosed wherein virtual computer systems in a pool are cloned from one or more parents, where the one or more parents are also in the pool and have the same, predetermined configuration.

Cloning tends to save time by making one or more copies of a virtual computer system via an automated, i.e., computer system implemented, process without manually finding configuration files and installing each guest operating system and set of applications. Clones are particularly useful for deploying numerous virtual computer systems to a group, such as for respective employees in a department, for example, who each need the same set of applications and data.

Figure 4:
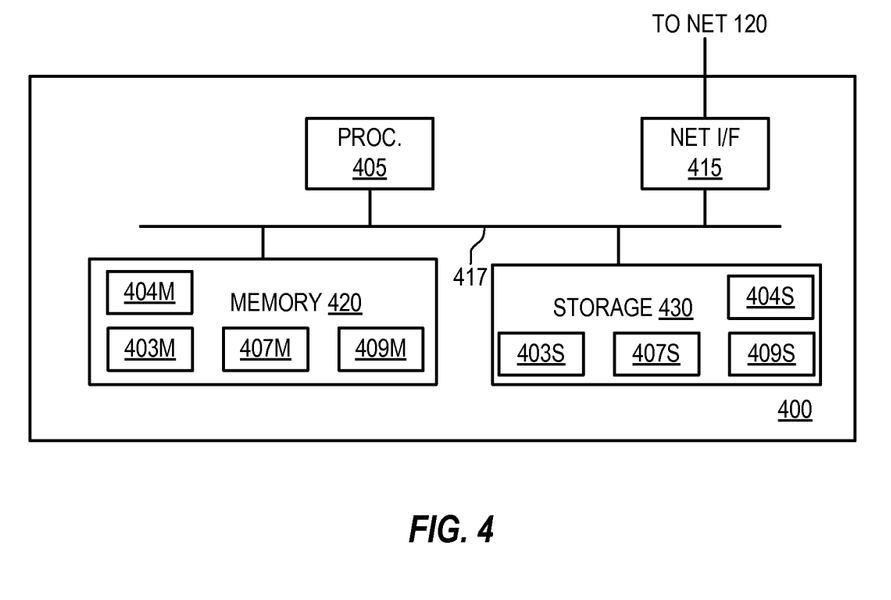
FIG. 4 depicts a computer system according to an embodiment of the present invention.

FIG. 4 illustrates details of a computer system 400 suitable, for example, as a computer server 63 of FIG. 2, etc. System 400 includes at least one central processing unit (CPU) 405, network interface 415, interconnect (i.e., bus) 417, memory 420 and storage device 430. CPU 405 may retrieve and execute programming instructions stored in memory 420. Similarly, CPU 405 may retrieve and store application data residing in memory 420. Interconnect 417 may facilitate transmission, such as of programming instructions and application data, among CPU 405, storage 430, network interface 415, and memory 420. CPU 405 is representative of a single CPU, multiple CPUs, a single CPU having multiple processing cores, and the like. Additionally, memory 420 is representative of a random access memory, which includes data and program modules for run-time execution, according to embodiments of the present invention. Although shown as a single unit, storage 430 may be a combination of fixed and/or removable storage devices, such as fixed disc drives, floppy disc drives, tape drives, removable memory cards or optical storage, network attached storage (NAS), or a storage area-network (SAN).

According to embodiments of the present invention, a dynamic resource pool management ("DRPM") module 403S in storage 430 provides DRPM process 403M as a run-time instance in memory 420 executing in computer system 400 for performing a resource allocation and management function, where process 403M may be included in service level management 84 function shown in FIG. 2; cloning module 407S in storage 430 provides cloning process 407M as a run-time instance in memory 420 executing in computer system 400 for performing a cloning function included in resource provisioning function 81 shown in FIG. 2; and demand measuring module 409S in storage 430 provides a demand measuring process 409M as a run-time instance in memory 420 executing in computer system 400 for performing a demand measuring function included in metering and pricing function 82 shown in FIG. 2. Also shown is data 404S in storage 430 and run-time instance 404M thereof in memory 420, which may include state and load lists as described herein below.

An operating system runs on processing unit 405. The operating system coordinates and provides control of various components within the data processing system 400 in FIG. 2. As a client, the operating system may be a commercially available operating system such as Microsoft® Windows 7@. An object-oriented programming system, such as the Java™ programming system, may run in conjunction with the operating system and provides calls to the operating system from Java™ programs or applications executing on data processing system 400.

As a server (e.g., server 63 of FIG. 2, etc.), data processing system 400 may be, for example, an IBMeServer™ System P® computer system, Power™ processor based computer system, or the like, running the Advanced Interactive Executive (AIX®) operating system or the LINUX® operating system, for example. Data processing system 400 may be a symmetric multiprocessor (SMP) system including a plurality of processors in processing unit 405. Alternatively, a single processor system may be employed.

In some embodiments, some or all mechanisms thereof may be implemented as application specific hardware, firmware, or the like. Likewise, mechanisms may be application software stored in a storage device and loaded into memory for execution by one or more hardware processors. As such, the computing device 400 shown in FIG. 2 becomes specifically configured to implement the mechanisms of the illustrative embodiments and specifically configured to perform operations described herein.

Those of ordinary skill in the art will appreciate that the hardware depicted herein may vary depending on the implementation. Other internal hardware or peripheral devices, such as flash memory, equivalent non-volatile memory, or optical disk drives and the like, may be used in addition to or in place of the hardware depicted in the figures. Also, the processes of the illustrative embodiments may be applied to a multiprocessor data processing system, other than the SMP system mentioned previously, without departing from the spirit and scope of the present invention.

Moreover, data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device that is configured with flash memory to provide non-volatile memory for storing operating system files and/or user-generated data, for example. Essentially, data processing system 400 may be any known or later developed data processing system without architectural limitation.

The above-described examples and depictions in the Figures are not meant to imply architectural limitations. Further, embodiments of the present invention may reside on any data storage medium (i.e., floppy disk, compact disk, hard disk, tape, ROM, RAM, etc.) used by a computer system. (The terms "computer," "system," "computer system," and "data processing system" are used interchangeably herein.)

Figure 3:
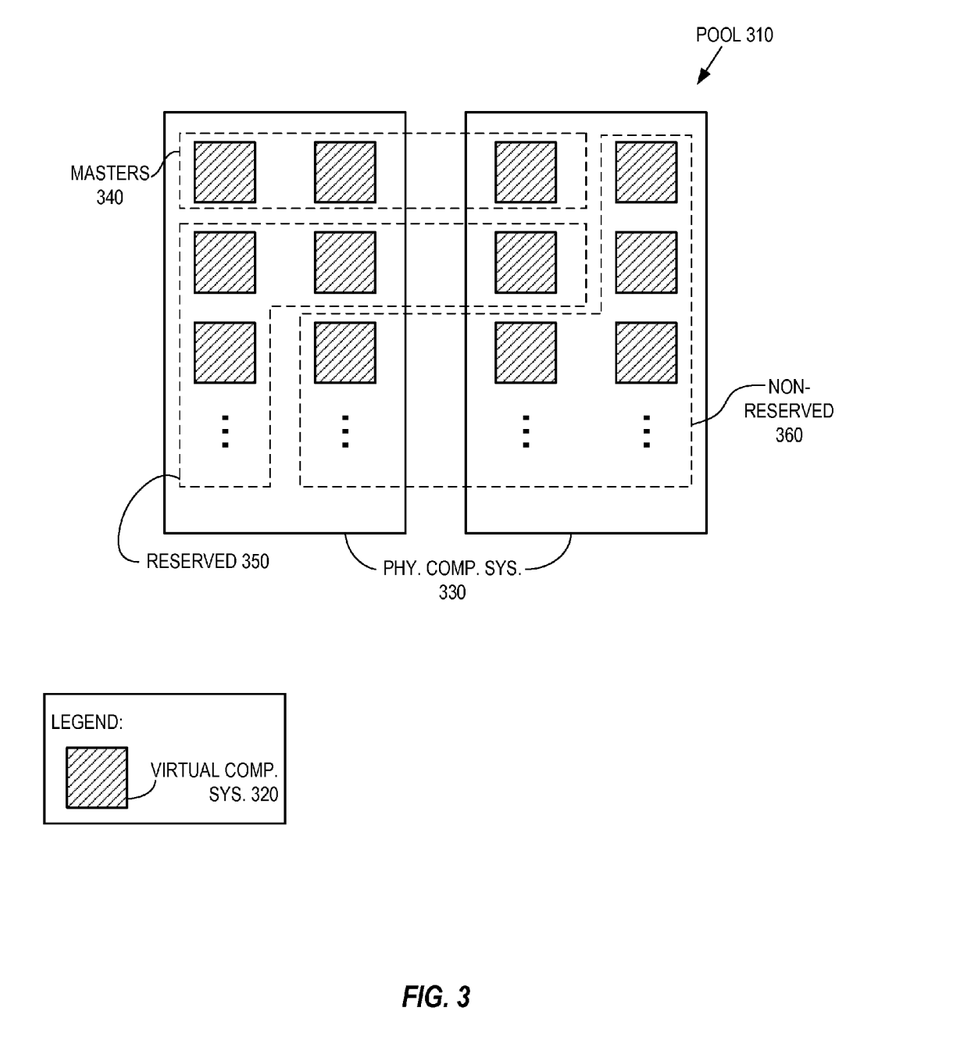
FIG. 3 depicts a pool of computer system resources according to an embodiment of the present invention.

Referring now to FIG. 3, a pool 310 of virtual computer systems 320 is shown for performing tasks, according to embodiments of the present invention. As shown, virtual computer systems 320 in pool 310 are distributed among physical computer systems 330, which may be in a single physical location, as shown, or may be distributed among physical locations. In other embodiments, virtual computer systems 320 may be in a single, physical computer system 330. In either case, virtual computer systems 320 in pool 310 have been cloned from one or more of the other virtual computer systems 320 in pool 310. When a virtual computer system 320 in pool 310 is the parent for cloning another virtual computer system 320 in pool 310, according to embodiments of the present invention, the parent is deemed to have a "master" status.

In the illustrated instance, three of the virtual computer systems 320 are operating as masters 340, which requires that each must maintain the same, predetermined configuration. Each of the others is either reserved 350, i.e., assigned to a user, or non-reserved 360, according to embodiments of the present invention. All of the non-reserved virtual computer systems 360 are configured alike with the predetermined configuration, which is either because they have never been assigned to a user since being cloned from one or more of the respective master virtual computer systems 340, or else because after being assigned to a user, they have been rebased back to the predetermined configuration, as will be further explained herein. (Restoring a reserved virtual computer system 320 to the original configuration of the virtual computer system 320 from which it was cloned is referred to herein as "rebasing" the cloned virtual computer system 320.) Since all of the non-reserved virtual computer systems 360 have the predetermined configuration, each one is available to be a master 340, according to embodiments of the present invention. It should be appreciated from the foregoing that each of the virtual computer systems 320 is constrained to have one of three, mutually exclusive states, namely: master, reserved and non-reserved.

DRPM process 403M is running in one or more of systems 330, according to embodiments of the present invention, to manage cloning and rebasing of virtual computer systems 320 for inclusion in pool 310, according to embodiments of the present invention. Alternatively, DRPM process 403M runs in one or more computer systems external to pool 310. DRPM process 403M directs cloning process 407M to clone each virtual computer system 320 from a respective master virtual computer system MVSCS that exists in pool 310.

Alternatively, DRPM process 403M directs another process to do the cloning. For example, each virtual computer system 320 in pool 310 may include a cloning process 407M that DRPM process 403M can direct to do cloning. Although the following describes cloning by DRPM process 403M, it should be understood that this may include DRPM process 403M directing another process such as cloning process 407M to do the cloning.

According to certain embodiments of the present invention, DRPM process 403M clones virtual computer systems 320 in response to user requests. That is, when DRPM process 403M grants a user request for control of a virtual computer system 320, process 403M clones virtual computer system 320 from a master virtual computer system 340 and assigns the cloned virtual computer system 320 to the user. According to other embodiments of the present invention, DRPM process 403M performs a load balancing function, wherein DRPM process 403M clones a virtual computer system 320 automatically in response to an amount of demand serviced by one or more of the virtual computer systems 320 for a given task or set of tasks, as measured by a demand measuring process 409M, and assigns the cloned virtual computer system 320 to particular services. In some embodiments, DRPM process 403M clones virtual computer systems 320 and assigns them to users in response to user requests and also clones virtual computer systems 320 and assigns them to services in response to demand.

Regarding DRPM process 403M granting a user request for control of a cloned virtual computer system 320 and assigning a cloned virtual computer system 320 to the user, "control" by the user in this context refers to the user's control of the configuration of the cloned virtual computer system 320 and the tasks to which it is applied. The user may, of course, employ the virtual computer system 320 for tasks in which other users are served. Further, even if the user to whom the cloned virtual computer system 320 is assigned allows other users to configure and control the virtual computer system 320, the user to whom the cloned virtual computer system 320 is assigned retains control of the virtual computer system 320 in that the user may choose to revoke service to, and control by, the other users.

Whether cloning is initiated by a computer system 330 implemented load balancer function automatically in response to an amount of demand, or whether it is initiated by user requests, once a clone virtual computer system 320 is created from a master virtual computer system 340, the clone and the master are separate virtual computer systems 320 with different MAC addresses and UUID's, where configuration changes made to a clone do not change the master and, likewise, configuration changes made to the master do not change the clone. Since a configuration of a cloned virtual computer system 320 may be changed once it is assigned to the user, when the user or service to which it is assigned releases control of the virtual computer system 320, DRPM process 403M restores the virtual computer system 320 to its original configuration state, according to embodiments of the present invention.

In an arrangement in which there is a virtual computer system external to a pool for cloning virtual computer systems to include in a pool, performance of an operation for rebasing a cloned virtual computer system is often limited by the current processing load of the external virtual computer system from which it was cloned. It might seem possible in this situation to improve rebasing performance by providing some predetermined number of additional external virtual computer systems in proportion to the number of cloned virtual computer systems in the pool, where the additional external virtual computer systems are also set to the same, fixed configuration as the first external virtual computer system, so that more external virtual computer systems are available for rebasing. That is, for example, it might seem possible to improve rebasing performance by having the first external virtual computer system clone another external virtual computer system for every twenty virtual computer systems 320 that it clones for inclusion in the pool. However, this actually is not practical due to reasons concerning scale.

According to embodiments of the present invention, any virtual computer system 320 in pool 310 that is not assigned to a user is deemed by DRPM process 403M to have a non-reserved status, wherein any non-reserved virtual computer system 360 in pool 310 is available to be selected as a master for cloning another virtual computer system 320. Once DRPM process 403M clones a virtual computer system 320 from a virtual computer system 320 and assigns the cloned virtual computer system 320 to a user, process 403M deems the cloned virtual computer system 320 to have a reserved status, i.e., deems it to be a reserved virtual computer system 350, wherein until the reserved virtual computer system 350 is rebased it is unavailable for assignment to other users and, likewise, unavailable for use as a master from which another virtual computer system 320 can be cloned.

Once DRPM process 403M clones a virtual computer system 320 from a selected virtual computer system 320 and assigns the cloned virtual computer system 320 to a user, DRPM process 403M also changes the status of the selected virtual computer system 320 to that of a master, i.e., deems it to be a master virtual computer system 340, until such time as all such cloned virtual computer systems 320 have been rebased. DRPM process 403M deems a master virtual computer system 340 as unavailable for assigning to a user and also does not permit changing the configuration of master virtual computer system 340.

To facilitate scalability needs, DRPM process 403M leverages systems 320 within resource pool 310 as potential masters 320 in particular ways described herein below, which enables selection of one or more additional master 340 when needed, i.e., dynamically. The selection may be based on usage load of masters 340, wherein DRPM process 403M may measure usage by RAM memory, CPU, network or disk storage usage, for example. DRPM process 403M also does live switch-off of any faulty master server 340 and, more generally, can reallocate resources by dynamically changing operation of one or more of the masters 340 to non-reserved mode. DRPM process 403M may select any of non-reserved virtual computer system 360 to operate as a master 340, which provides flexibility, high availability and can provide very fast service, such as by providing one master 340 dedicated to a single cloned virtual computer system 350 assigned to a user, if needed. Advantageously, process 403M permits reallocation on request, so that resources are not necessarily locked in a fixed configuration, but rather are dynamically allocated in a pool 310 with a variable amount of masters 340.

Figure 5:
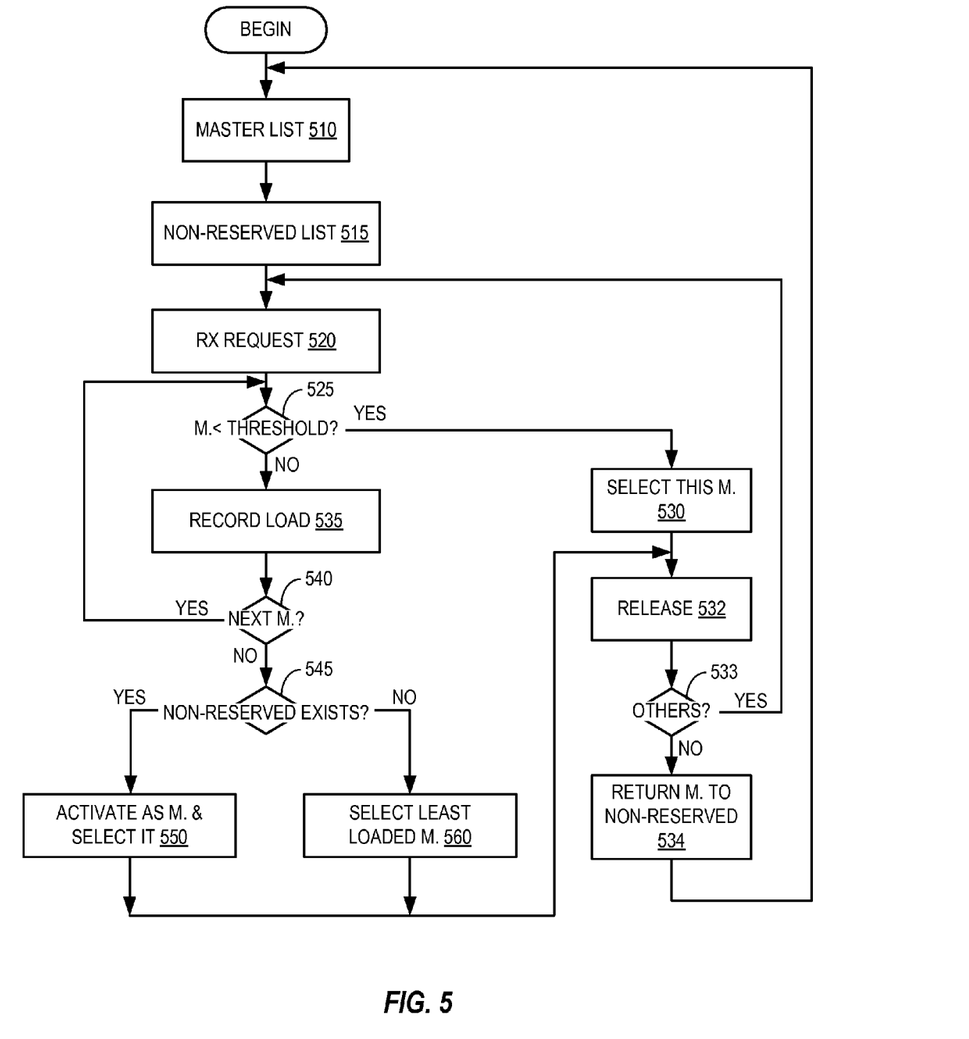
FIG. 5 depicts a process for managing resources according to an embodiment of the present invention.

Referring now to FIG. 3 along with FIG. 5, which illustrates details of DRMP process 403M (FIG. 4) for a pool 310 of physical computer systems 330 and virtual computer systems 320 running thereon, according to embodiments of the present invention. To dynamically manage rebasing in pool 310, DRPM process 403M builds a first state list in a first action 510, which records virtual computer systems 340 in pool 310 that are operating in master mode, and builds a second state list in a second action 515, which records virtual computer systems 360 in pool 310 that are currently non-reserved. The second list may be a null list.

Next, at 520, DRPM process 403M receives a request from a user 120 to release a cloned virtual computer system 350 that was assigned to the user. DRPM process 403M responsively takes action 525, which includes accessing the first list, determining the first master 320 on the list and determining whether the load of the first master is below a predetermined threshold. If yes at 525, then DRPM process 403M selects this master and allocates a rebasing request to the selected master at 530.

Then, at 532, the newly released, cloned virtual computer system 350 is rebased by DRPM process 403M to the selected master 340. After that, DRPM process 403M proceeds at 533 to determine if any other rebasing requests are pending for or being processed by selected master 340. (It should be appreciated that multiple instances of the process shown in FIG. 5 may execute concurrently, and that rebasing requests 530 may be pending or executing concurrently for a given master computer system 340.) If yes at 533, then DRPM process 403M, without changing the master status of selected master 340, goes to 520 to receive any next user request. If no at 533, then DRPM process 403M, at 534, first changes the status of master 340 back to that of a non-reserved virtual computer system 360 (by changing the list of masters and the list of non-reserved systems) before going to 520 to receive any next user request, provided, however, that DRPM process 403M determines at 534 whether selected master 340 is the only remaining master and does not change the status of selected master 340 back to that of a non-reserved virtual computer system 360 at 534 if master 340 is the only remaining master. In alternative embodiments, does not change the status of selected master 340 back to that of a non-reserved virtual computer system 360 at 534 if there are less than a predetermined number of masters 340, wherein the predetermined number may be some number greater than one.

If no at 525, then DRPM process 403M records at 535 the load of the master in a load list and determines at 540 whether the first state list has another master. If yes at 540, then DRPM process 403M repeats action 525 for the next master on the first state list.

If no at 540, DRPM process 403M responsively takes action 545, which includes accessing the second state list and determining whether the list indicates there currently is a non-reserved virtual computer system 360 in pool 310. If yes at 545, DRPM process 403M goes to action 550, which includes selecting one of the non-reserved virtual computer systems 360, changing status of the selected non-reserved virtual computer system 360 to that of a master 340 (by changing the list of masters and the list of non-reserved systems), and allocating the user rebasing request to the selected virtual computer system 320, i.e., the newly deemed master 340.

Then, at 532, the newly released, cloned virtual computer system 350 is rebased by DRPM process 403M to newly deemed master 340. After that, DRPM process 403M proceeds at 533 to determine if any other rebasing requests are pending for or being processed by newly deemed master 340. If yes at 533, then DRPM process 403M, without changing the master status of newly deemed master 340, goes to 520 to receive any next user request. If no at 533, then DRPM process 403M, at 534, first changes the status of master 340 back to that of a non-reserved virtual computer system 360 (by changing the list of masters and the list of non-reserved systems) before going to 520 to receive any next user request, provided, however, that DRPM process 403M determines at 534 the number of masters 340 and does not change the status of master 340 back to that of a non-reserved virtual computer system 360 at 534 if the number of masters 340 is less than a predetermined minimum.

If no at 545, then DRPM process 403M proceeds to action 560, which includes accessing the load list that was compiled via actions 535, determining and selecting the least loaded master 340, and allocating the user rebasing request to that selected master 340. (As an alternative to compiling the load list iteratively at 535, as described above, DRPM process 403M may query demand measuring module 409M to determine the individual loads of all masters at once right before selecting the master 340 with the lowest load at 560.) Then, at 532, the newly released, cloned virtual computer system 350 is rebased by DRPM process 403M to the selected master 340, and so on through actions 533 and 534 to 520 for receiving any next user request. (Recall, once again, that DRPM process 403M determines at 534 whether selected master 340 is the only remaining master and does not change the status of selected master 340 back to that of a non-reserved virtual computer system 360 at 534 depending on the number of remaining masters and the predetermined minimum.)

From the above it should be understood that servers in a pool that are currently designated as masters may become overloaded by requests for rebasing or may fail from time to time. The dynamic management of cloning and rebasing described herein, enables selecting non-reserved virtual computer systems 360 from pool 310 to perform as masters 340 for rebasing as needed, i.e., without locking the selected non-reserved virtual computer systems 360 into a persistent master state. Conversely, master virtual computer systems 340 in pool 310 may be changed to non-reserved mode of operation, which makes them available for assignment to users as non-reserved virtual computer systems 360, in response to decreases in the processing load of masters 340, provided that at least a predetermined minimum number of systems 320 are maintained as masters 340.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

Many modifications and variations will be apparent to those of ordinary skill in the art without departing from the scope and spirit of the invention. The embodiments presented herein were chosen and described in order to best explain the principles of the invention and the practical application and to enable others of ordinary skill in the art to understand the invention for various embodiments with various modifications as are suited to the particular use contemplated. The description of the present invention has been presented for purposes of illustration and description, but is not intended to be exhaustive or limited to the invention in the form disclosed.

What is claimed is:

1. A method for managing a pool of virtual computer systems, comprising:

assigning master status and a rebasing task to at least one virtual computer system of the pool, wherein virtual computer systems in the pool are cloned from one or more parent virtual computer systems having a predetermined configuration and the at least one virtual computer system assigned master status has the predetermined configuration;

assigning a non-reserved status to virtual computer systems of the pool that are not assigned tasks; and selecting a virtual computer system of the pool to respond to a rebasing request for restoring configuration of a virtual computer system of the pool to the predetermined configuration, wherein the selecting includes selecting one of the at least one virtual computer system that currently has a master status and that currently has a processing load less than a predetermined threshold and, when no virtual computer system of the pool currently has a master status and a processing load less than the predetermined threshold, selecting a non-reserved one of the virtual computer systems to perform rebasing for the request and changing the non-reserved status of the selected, non-reserved one of the virtual computer systems to master status.

2. The method of claim 1, wherein selecting the virtual computer system of the pool to respond to the rebasing request further includes, when no virtual computer system of the pool currently has a master status and a processing load less than the predetermined threshold and no virtual computer system of the pool currently has a non-reserved status, selecting a least loaded virtual computer system currently having a master status.

3. The method of claim 1, comprising:

assigning a reserved status and other tasks to other virtual computer systems of the pool.

4. The method of claim 1, comprising:

assigning a reserved status and user control to other virtual computer systems of the pool.

5. The method of claim 4, wherein the reserved virtual computer systems are provided to users as a service in a cloud environment.

6. The method of claim 1, wherein the method comprises:

rebasing a reserved status virtual computer system to the predetermined configuration of the selected virtual computer system; and changing status of the rebased virtual computer system to non-reserved status.

7. The method of claim 6, wherein the method comprises:

changing status of the selected virtual computer system to that of a non-reserved virtual computer system after performing the requested rebasing when no other rebasing requests are pending for or being processed by the selected virtual computer system and the number of virtual computer systems having master status is less than a predetermined minimum.

8. A system for managing a pool of virtual computer systems, comprising:

a processor; and computer readable storage media having instructions stored thereon for execution by the processor, wherein the instructions executed by the processor cause the processor to perform operations comprising:

assigning master status and a rebasing task to at least one virtual computer system of the pool for restoring configuration of a virtual computer system of the pool to the predetermined configuration, wherein virtual computer systems in the pool are cloned from one or more parent virtual computer systems having a predetermined configuration and the at least one virtual computer system assigned master status has the predetermined configuration;

assigning a non-reserved status to virtual computer systems of the pool that are not assigned tasks; and selecting a virtual computer system of the pool to respond to a rebasing request, wherein the selecting includes selecting one of the at least one virtual computer system that currently has a master status and that currently has a processing load less than a predetermined threshold and, when no virtual computer system of the pool currently has a master status and a processing load less than the predetermined threshold, selecting a non-reserved one of the virtual computer systems to perform rebasing for the request and changing the non-reserved status of the selected, non-reserved one of the virtual computer systems to master status.

9. The system of claim 8, wherein selecting the virtual computer system of the pool to respond to the rebasing request further includes, when no virtual computer system of the pool currently has a master status and a processing load less than the predetermined threshold and no virtual computer system of the pool currently has a non-reserved status, selecting a least loaded virtual computer system currently having a master status.

10. The system of claim 8, wherein the instructions executed by the processor cause the processor to perform operations comprising:

assigning a reserved status and other tasks to other virtual computer systems of the pool.

11. The system of claim 8, wherein the instructions executed by the processor cause the processor to perform operations comprising:

assigning a reserved status and user control to other virtual computer systems of the pool.

12. The system of claim 11, wherein the reserved virtual computer systems are provided to users as a service in a cloud environment.

13. The system of claim 8, wherein the instructions executed by the processor cause the processor to perform operations comprising:

rebasing a reserved status virtual computer system to the predetermined configuration of the selected virtual computer system; and changing status of the rebased virtual computer system to non-reserved status.

14. The system of claim 13, wherein the instructions executed by the processor cause the processor to perform operations comprising:

changing status of the selected virtual computer system to that of a non-reserved virtual computer system after performing the requested rebasing when no other rebasing requests are pending for or being processed by the selected virtual computer system and the number of virtual computer systems having master status is less than a predetermined minimum.

15. A computer program product for managing a pool of virtual computer systems, wherein the computer program product comprises a computer readable storage medium having instructions stored thereon for execution by a computer, and the instructions, when executed by the computer, cause the computer to perform operations comprising:

assigning master status and a rebasing task to at least one virtual computer system of the pool for restoring configuration of a virtual computer system of the pool to the predetermined configuration, wherein virtual computer systems in the pool are cloned from one or more parent virtual computer systems having a predetermined configuration and the at least one virtual computer system assigned master status has the predetermined configuration;

assigning a non-reserved status to virtual computer systems of the pool that are not assigned tasks; and selecting a virtual computer system of the pool to respond to a rebasing request, wherein the selecting includes selecting one of the at least one virtual computer system that currently has a master status and that currently has a processing load less than a predetermined threshold and, when no virtual computer system of the pool currently has a master status and a processing load less than the predetermined threshold, selecting a non-reserved one of the virtual computer systems to perform rebasing for the request and changing the non-reserved status of the selected, non-reserved one of the virtual computer systems to master status.

16. The computer program product of claim 15, wherein selecting the virtual computer system of the pool to respond to the rebasing request further includes, when no virtual computer system of the pool currently has a master status and a processing load less than the predetermined threshold and no virtual computer system of the pool currently has a non-reserved status, selecting a least loaded virtual computer system currently having a master status.

17. The computer program product of claim 15, wherein the instructions, when executed by the computer, cause the computer to perform operations comprising:

assigning a reserved status and other tasks to other virtual computer systems of the pool.

18. The computer program product of claim 15, wherein the instructions, when executed by the computer, cause the computer to perform operations comprising:

assigning a reserved status and user control to other virtual computer systems of the pool.

19. The computer program product of claim 15, wherein the instructions, when executed by the computer, cause the computer to perform operations comprising:

rebasing a reserved status virtual computer system to the predetermined configuration of the selected virtual computer system; and changing status of the rebased virtual computer system to non-reserved status.

20. The computer program product of claim 19, wherein the instructions, when executed by the computer, cause the computer to perform operations comprising:

changing status of the selected virtual computer system to that of a non-reserved virtual computer system after performing the requested rebasing when no other rebasing requests are pending for or being processed by the selected virtual computer system and the number of virtual computer systems having master status is less than a predetermined minimum.

* * * * *